UNITED STATES PATENT OFFICE.

WALTHER FELD, OF HÖNNINGEN-ON-THE-RHINE, GERMANY.

PRODUCTION OF AMMONIUM NITRATE.

No. 839,741.  Specification of Letters Patent.  Patented Dec. 25, 1906.

Application filed May 1, 1906. Serial No. 314,700.

*To all whom it may concern:*

Be it known that I, WALTHER FELD, chemist and manufacturer, a subject of the King of Prussia, German Emperor, residing at Hönningen-on-the-Rhine, in the Kingdom of Prussia and German Empire, have invented new and useful Improvements in the Production of Ammonium Nitrate, of which the following is a specification.

Hitherto nitrate of ammonia has been obtained by neutralizing ammonia with nitric acid or by subjecting nitrate of soda instead of chlorid of soda to the ammonia-soda process by treating a liquor containing both ammonia and nitrate of soda with gases containing carbonic acid.

According to my invention, nitrate of ammonia is produced by subjecting a nitrate of an alkali or of an alkaline earth to the action of gas containing both ammonia and carbonic acid in a dilute condition—such, for instance, as coal-gas, coke-oven gas, blast-furnace gas, power-gas, and other gases of distillation.

Hitherto the ammonia from such gases has been absorbed by water, then the weak and impure ammonia solution has been concentrated and purified by distillation, and then after a second distillation the ammonia has been added to a solution of nitrate of soda or nitrate of soda has been dissolved in a solution containing ammonia, and this solution containing both ammonia and nitrate of soda has been treated with gases containing carbonic acid.

By my invention the process is considerably simplified by subjecting a nitrate of an alkali or of an alkaline earth (without being previously treated with ammonia alone and then with carbonic acid alone) directly to the action of gases which contain both ammonia and carbonic acid, as aforesaid, in great dilution. The said gases as a rule contain, besides ammonia, sufficient carbonic acid for the treatment of alkaline earths to precipitate the whole of the alkaline earth in the form of insoluble carbonate in forming soluble nitrate of ammonia, one molecular proportion of carbonic acid to two molecular proportions of ammonia being necessary. In using a nitrate of an alkali, such as nitrate of soda, the gas must contain at least one molecular proportion of carbonic acid to each molecular proportion of ammonia to precipitate the alkali as bicarbonate. If the amount of carbonic acid in the gas be less than this, carbonic acid in any form is added to the gas or the nitrate is alternately or simultaneously treated with gas containing both ammonia and carbonic acid and with gas containing carbonic acid alone, such as pure carbonic-acid gas, or gases which are products of combustion, or the like.

The following is an example of how this invention may be performed; but it is to be understood that I do not limit myself to the use of the particular gas or the particular nitrate mentioned, nor to the proportions given in this example.

In carrying out this invention—for example, with nitrate of soda and with coke-oven gas containing ten grams of ammonia and thirty grams of carbonic acid per cubic meter—after tar and water have been separated from the gas, this is passed over or through a concentrated solution of the nitrate. I may even add to the saturated solution undissolved nitrate, this being gradually dissolved in proportion as the salt in solution is transformed into nitrate of ammonia, which is far more easily dissolved than are the other nitrates. By this treatment I get a highly-concentrated solution of nitrate of ammonia. The solution is treated with the gas until practically all the nitrate of soda is converted into bicarbonate of soda and the escaping gas is treated with a fresh solution of nitrate of soda in order to absorb all the ammonia and corresponding carbonic acid from the gas. The ammonia and carbonic acid being very diluted in the gas the absorption of ammonia and carbonic acid takes place slowly or gradually, and therefore the reaction does not cause such rise of temperature in the solution as would cause the absorption to be incomplete or cause ammonia already absorbed to be volatilized. The water being separated from the gas before it is passed over or through the solution the solution is not diluted, and therefore the yield of bicarbonate of soda is high, which is an important practical advantage in carrying out the process.

If gases containing sulfureted hydrogen be employed, the solutions will be contaminated by sulfids. In such cases, therefore, the sulfureted hydrogen must either be separated from the gas, passing it into contact with the nitrate of an alkali or of an alkaline earth, or both the ammonia and carbonic acid of the gas (before this is passed over or through the nitrate solution) are absorbed by a solution of a salt, which does not absorb sulfureted hydrogen and which when heated gives off the ammonia and carbonic acid absorbed. Suitable salts for this purpose are salts of magnesia, such as sulfate, chlorid, and the like. In using chlorid of magnesia carbonate of magnesia and chlorid of ammonia are formed. By boiling this sludge ammonia and carbonic acid are distilled off and passed over or through the solution of the nitrate of an alkali or of an alkaline earth. In order in this case to obtain the ammonia and carbonic acid in a suitably-diluted condition, air or purified gases of combustion or the like can be passed through the sludge while it is boiling. Of the gas for dilution so much is used that the proportion of ammonia and carbonic acid in the gas escaping from the distilling-vat is such that when the gas is cooled no carbonate of ammonia is precipitated in the pipes leading to the absorber.

I claim as my invention—

1. The production of nitrate of ammonia by subjecting a nitrate of an alkali to the action of gas containing both ammonia and carbonic acid in a dilute condition.

2. The production of nitrate of ammonia by subjecting a nitrate of an alkali to the action of gas containing both ammonia and carbonic acid in a dilute condition, and of carbonic-acid gas.

In testimony whereof I have signed this specification in the presence of two subscribing witnesses.

WALTHER FELD.

Witnesses:
 WOLDEMAR HAUPT,
 HENRY HASPER.